United States Patent
Huang

(10) Patent No.: US 11,260,554 B2
(45) Date of Patent: Mar. 1, 2022

(54) BAND SAW MACHINE HAVING A CLEANING UNIT

(71) Applicant: BLUE STEEL MACHINERY CO., Taichung (TW)

(72) Inventor: Yu-Sheng Huang, Taichung (TW)

(73) Assignee: BLUE STEEL MACHINERY CO., Taichung (TW)

(*) Notice: Subject to any disclaimer, the term of this patent is extended or adjusted under 35 U.S.C. 154(b) by 289 days.

(21) Appl. No.: 16/725,007

(22) Filed: Dec. 23, 2019

(65) Prior Publication Data
US 2020/0361113 A1 Nov. 19, 2020

(30) Foreign Application Priority Data
May 13, 2019 (TW) .................. 108116417

(51) Int. Cl.
*B27B 13/16* (2006.01)
*B27B 31/00* (2006.01)
(Continued)

(52) U.S. Cl.
CPC .............. *B27B 13/16* (2013.01); *B27B 13/02* (2013.01); *B27B 31/003* (2013.01); *B27B 31/006* (2013.01); *B27B 31/06* (2013.01); *Y10T 83/242* (2015.04); *Y10T 83/7189* (2015.04); *Y10T 83/95* (2015.04)

(58) Field of Classification Search
CPC . Y10T 83/242; Y10T 83/207; Y10T 83/2066; Y10T 83/707; Y10T 83/7089; Y10T 83/7158; Y10T 83/7189; Y10T 83/95; B27B 13/16; B27B 13/02; B27B 13/00; B27B 31/003; B27B 31/006; B27B 31/06; B27B 15/00; B27B 15/08
See application file for complete search history.

(56) References Cited

U.S. PATENT DOCUMENTS 3,537,346 A * 11/1970 Gaston ................. B23D 59/006
83/165
6,679,145 B1 * 1/2004 Lee ....................... B23D 59/006
144/252.2
(Continued)

FOREIGN PATENT DOCUMENTS

| CN | 108162073 | 6/2018 |
| CN | 109291140 | 2/2019 |

OTHER PUBLICATIONS

Search Report appended to an Office Action, which was issued to Taiwanese counterpart application No. 108116417 by the TIPO dated Sep. 4, 2019, with an English translation thereof.

*Primary Examiner* — Phong H Nguyen
(74) *Attorney, Agent, or Firm* — Nixon & Vanderhye PC

(57) ABSTRACT

A band saw machine is adapted for cutting a lumber, and includes a frame body unit, a transport unit, a cutting unit, a cleaning unit and a guide unit. The frame body unit includes a base plate and a hood body extending rearward from the base plate and cooperating with a conveyor belt of the transport unit to define an output passage. The cutting unit is adapted to cut the lumber into an upper piece and a lower piece. The guide unit includes two guide rollers mounted to the hood body, extending into the outlet passage, and adapted to separate the upper piece from the lower piece. The cleaning unit includes an air lance for directing an air stream to the conveyor belt.

13 Claims, 12 Drawing Sheets

(51) Int. Cl.
*B27B 13/02* (2006.01)
*B27B 31/06* (2006.01)

(56) References Cited

U.S. PATENT DOCUMENTS

2007/0044609 A1* 3/2007 Brazell ................ B23D 59/006
                                                        83/100
2019/0061027 A1* 2/2019 Stolzer ................ B23D 55/046

* cited by examiner

BAND SAW MACHINE HAVING A CLEANING UNIT

CROSS-REFERENCE TO RELATED APPLICATIONS

This application claims priority of Taiwanese Patent Application No. 108116417, filed on May 13, 2019.

FIELD

The disclosure relates to a cutting machine, more particularly, to a wood cutting band saw machine.

BACKGROUND

Referring to FIGS. 1 and 2, a conventional wood cutting band saw machine includes an upright base support 11, a cutting unit 12 disposed on the base support 11, and a transport unit 13 extending in a front-rear direction (A) through the base support 11.

The base support 11 includes a frame body 111 and a passage 112 that extends through the frame body 111.

The cutting unit 12 includes two cutter modules 121 disposed on the frame body 111 and spaced apart from each other in an up-down direction (B). Each cutter module 121 has a continuous band saw blade 122 that has a cutting section travelling alongside the passage 112.

The transport unit 13 includes a continuous conveyor belt 131 travelling through the passage 112 in the front-rear direction (A).

During cutting operation, a lumber 15 is laid on the conveyor belt 131 at an upstream side of the frame body 111, and is moved past the two continuous band saw blades 122 by the conveyor belt 131 to be cut into three pieces, that is, the upper, the top and the lower pieces in the thickness direction. These three pieces will continue to be carried downstream by the conveyor belt 131 through the passage 122 to complete the cutting operation.

However, in this conventional wood cutting band saw machine, sawdust (not shown) produced during cutting the lumber 15 will accumulate on the conveyor belt 133 and need to be cleaned regularly, otherwise it will affect the cutting effect. In addition, it takes time to clear away the sawdust attached to external surfaces of the three pieces of the lumber 15.

SUMMARY

Therefore, the object of the disclosure is to provide a wood cutting band saw machine which resolves at least one of the disadvantages of the prior art.

According to the disclosure, a band saw machine is adapted for cutting a lumber, and comprises a frame body unit, a transport unit, a cutting unit, a cleaning unit, and a guide unit.

The frame body unit includes a support frame module and a cleaning hood module. The support frame module has an upright base plate that is formed with an outlet port extending therethrough in a front-rear direction. The cleaning hood module includes a hood body that extends rearward from the base plate in the front-rear direction, that surrounds the outlet port, and that has two first openings formed respectively in opposite sides of the hood body in a left-right direction which is perpendicular to the first-rear direction.

The transport unit is connected to the frame body unit, and includes a conveyor belt that extends in the front-rear direction through the outlet port. The conveyor belt is adapted to transport the lumber from an upstream side of the outlet port which is in front of the outlet port to a downstream side of the outlet port which is behind the outlet port. The cleaning hood module cooperates with the conveyor belt to define an output passage that is communicated with the two first openings and the outlet port and that has a rear open end.

The cutting unit is connected to the support frame module, and includes a first cutter module. The first cutter module includes a first continuous band saw blade that has a cutting section travelling alongside the outlet port and above the conveyor belt, and that is adapted to cut the lumber into an upper piece and a lower piece.

The cleaning unit includes a first air lance that extends through one of the first openings of the hood body of the cleaning hood module for directing an air stream to the conveyor belt.

The guide unit includes two upper guide rollers that are mounted rotatably on the hood body, that extend respectively through the two first openings into the outlet passage, and that are disposed in front of the first air lance. The two upper guide rollers are disposed higher than the cutting section of the first continuous band saw blade and are adapted to be respectively in contact with two opposite sides of the lumber in the left-right direction to separate the upper piece of the lumber from the lower piece of the lumber.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
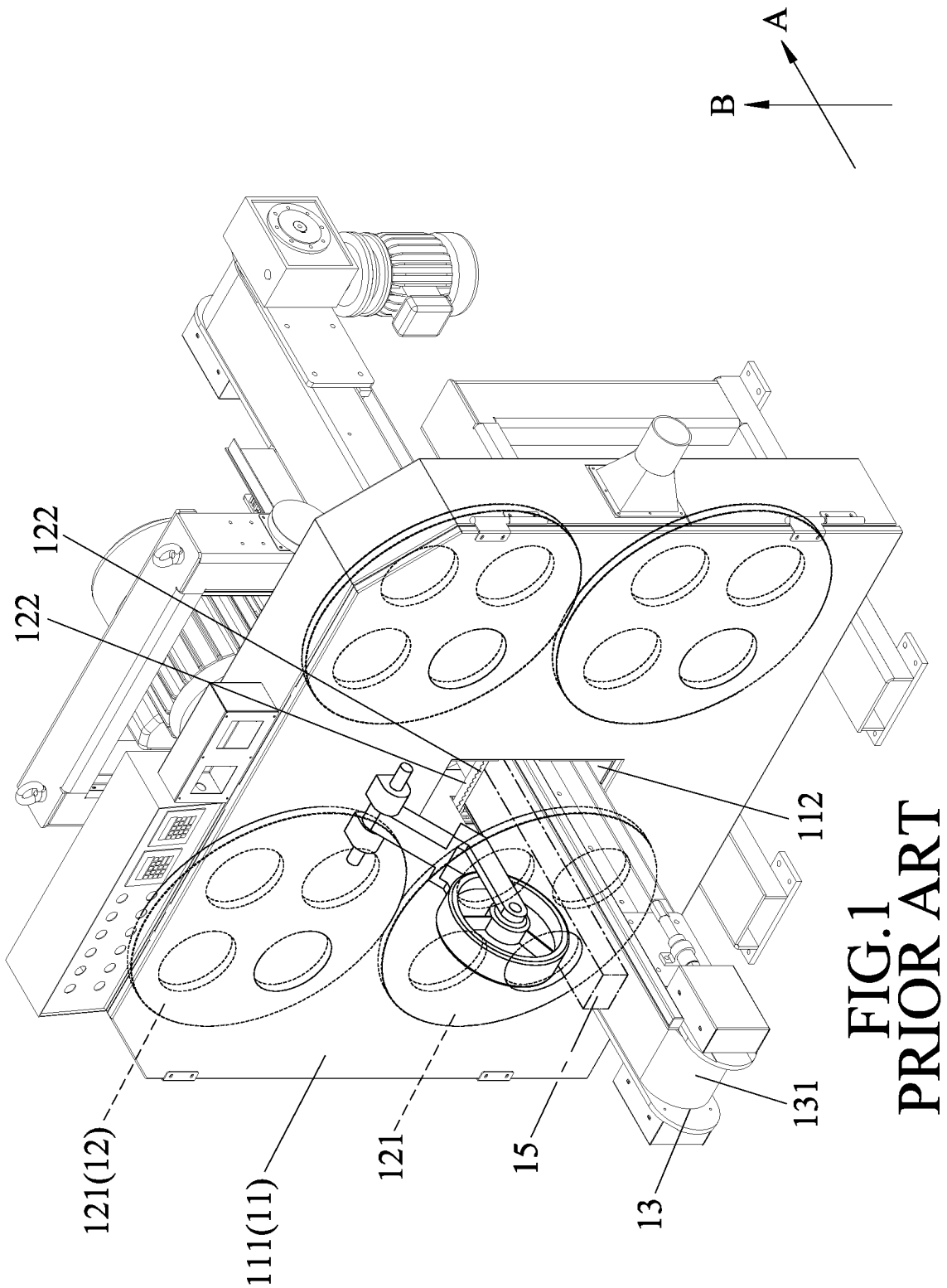
FIG. 1 is a perspective view of a conventional band saw machine.
Figure 2:
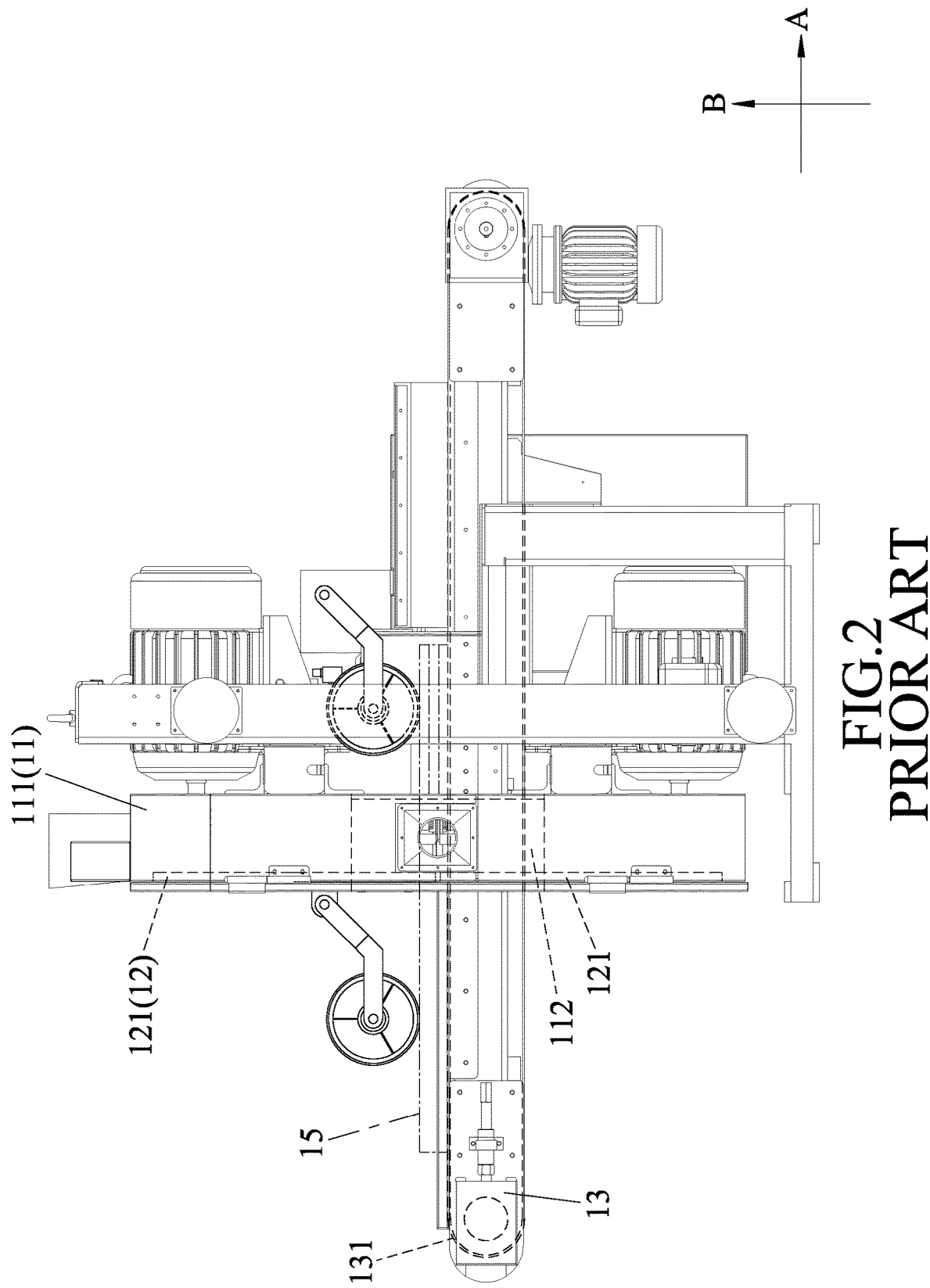
FIG. 2 is a side view of the conventional band saw machine.
Figure 3:
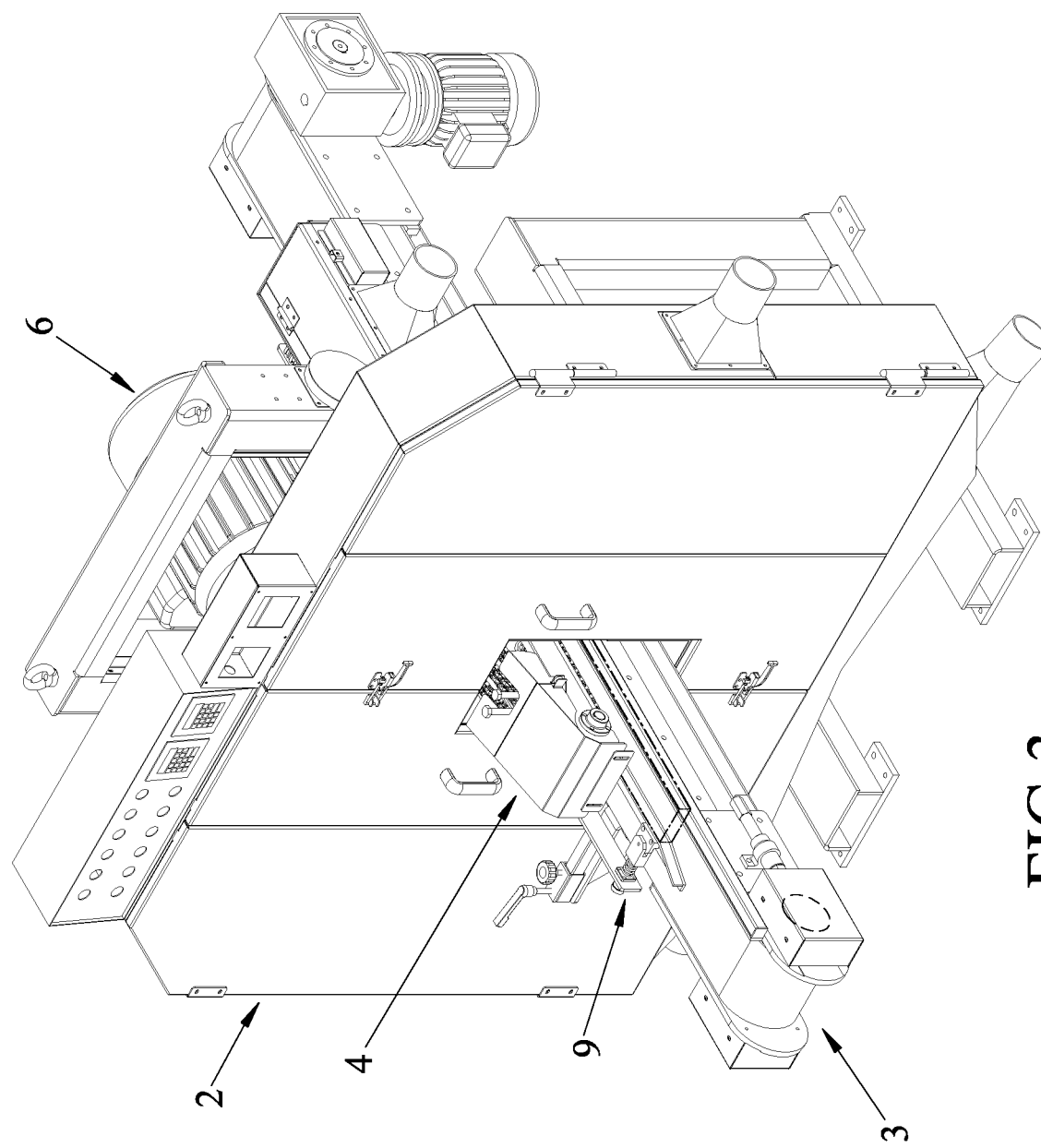
FIG. 3 is a perspective view of an embodiment of the band saw machine according to the disclosure.
Figure 4:
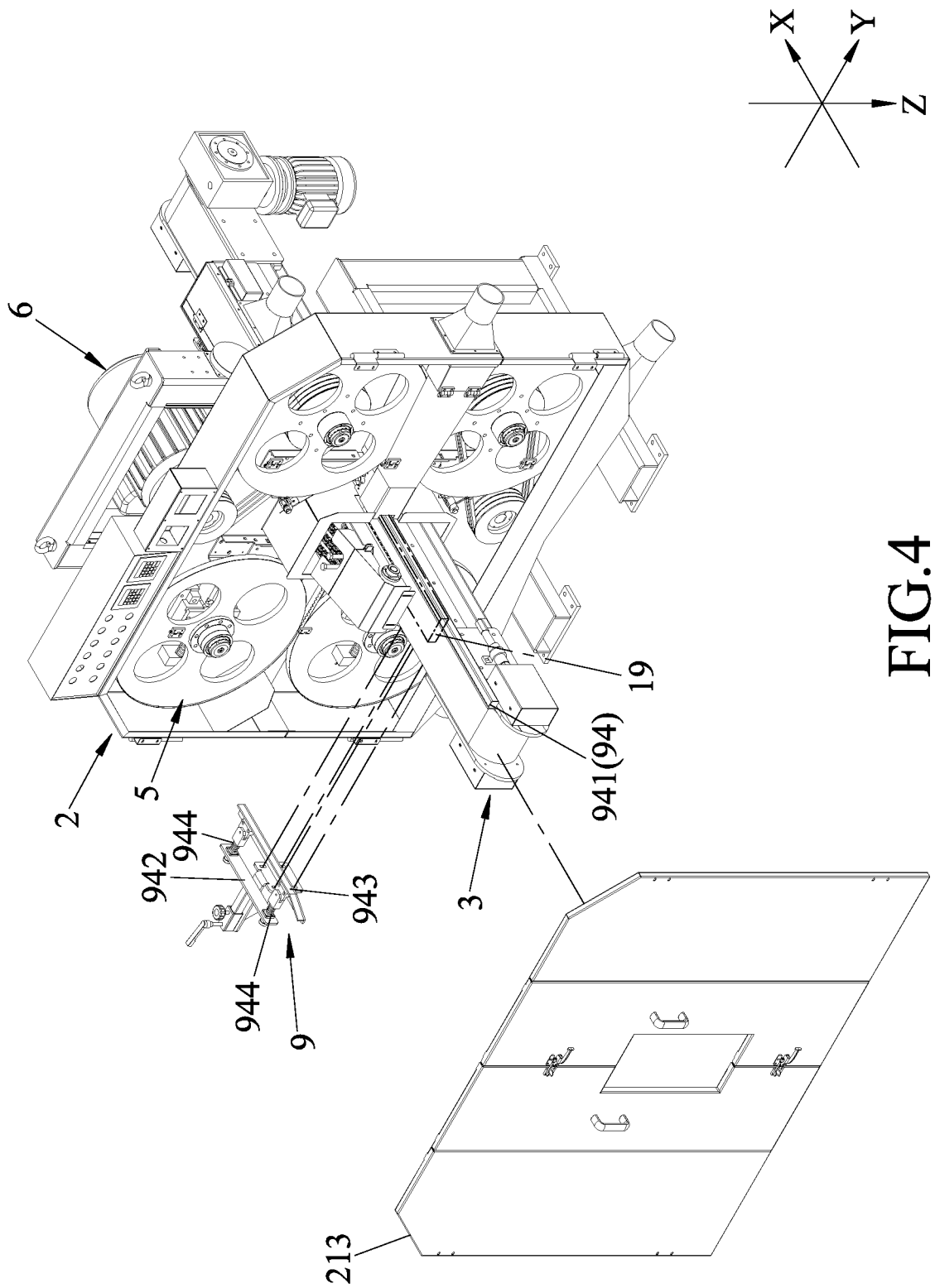
FIG. 4 is a partially exploded perspective view of the embodiment.
Figure 5:
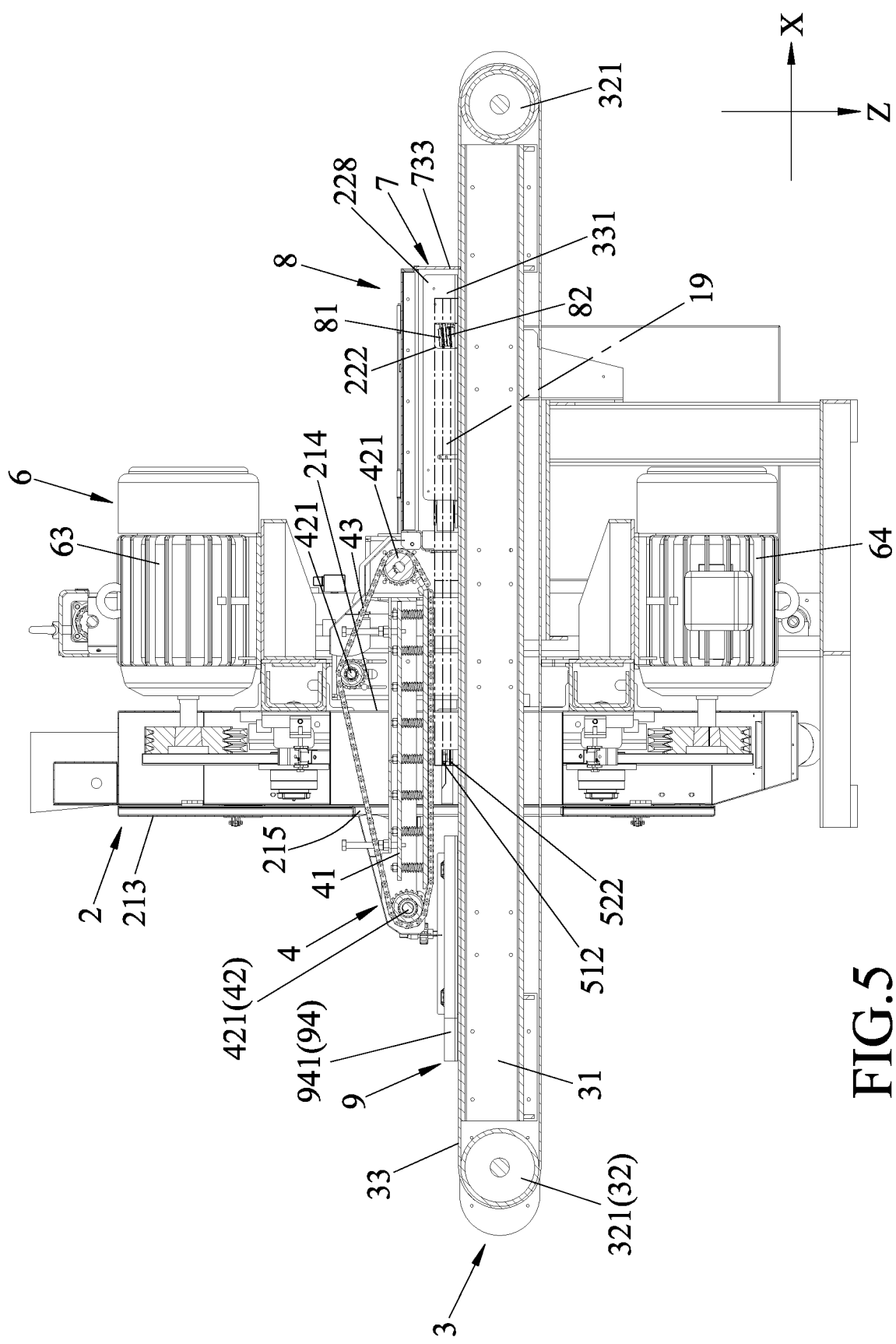
FIG. 5 is a cross-sectional view of the embodiment.

As shown in FIGS. 3 to 5, an embodiment of the band saw machine according to the present disclosure is adapted for cutting a lumber 19, and is adapted to be connected to an exhaust fan (not shown). The band saw machine includes a frame body unit 2, a transport unit 3, a hold-down unit 4, a cutting unit 5, a drive unit 6, a cleaning unit 7, a guide unit 8, and a levelling unit 9.

Figure 6:
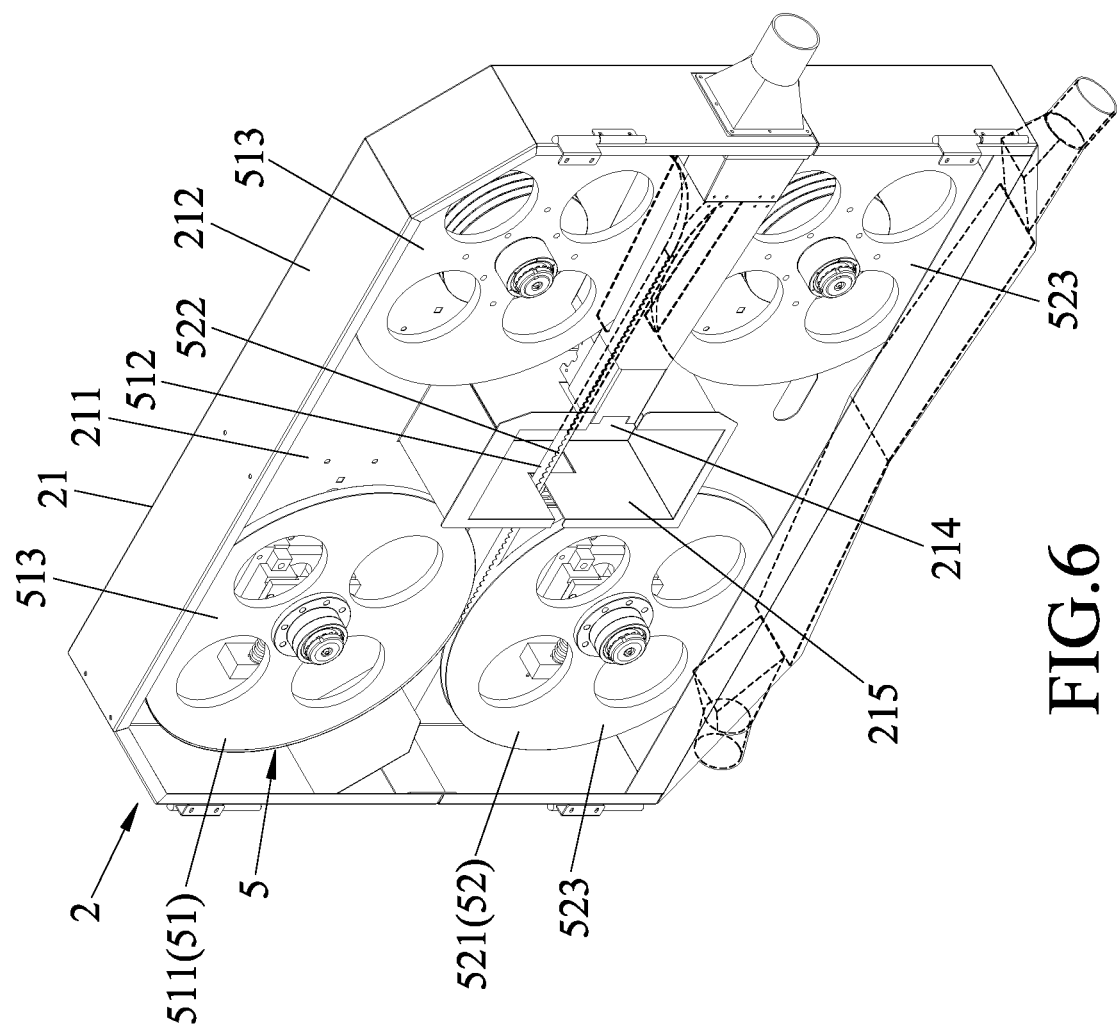
FIG. 6 is a fragmentary perspective view of a support frame module and a cutting unit of the embodiment.
Figure 7:
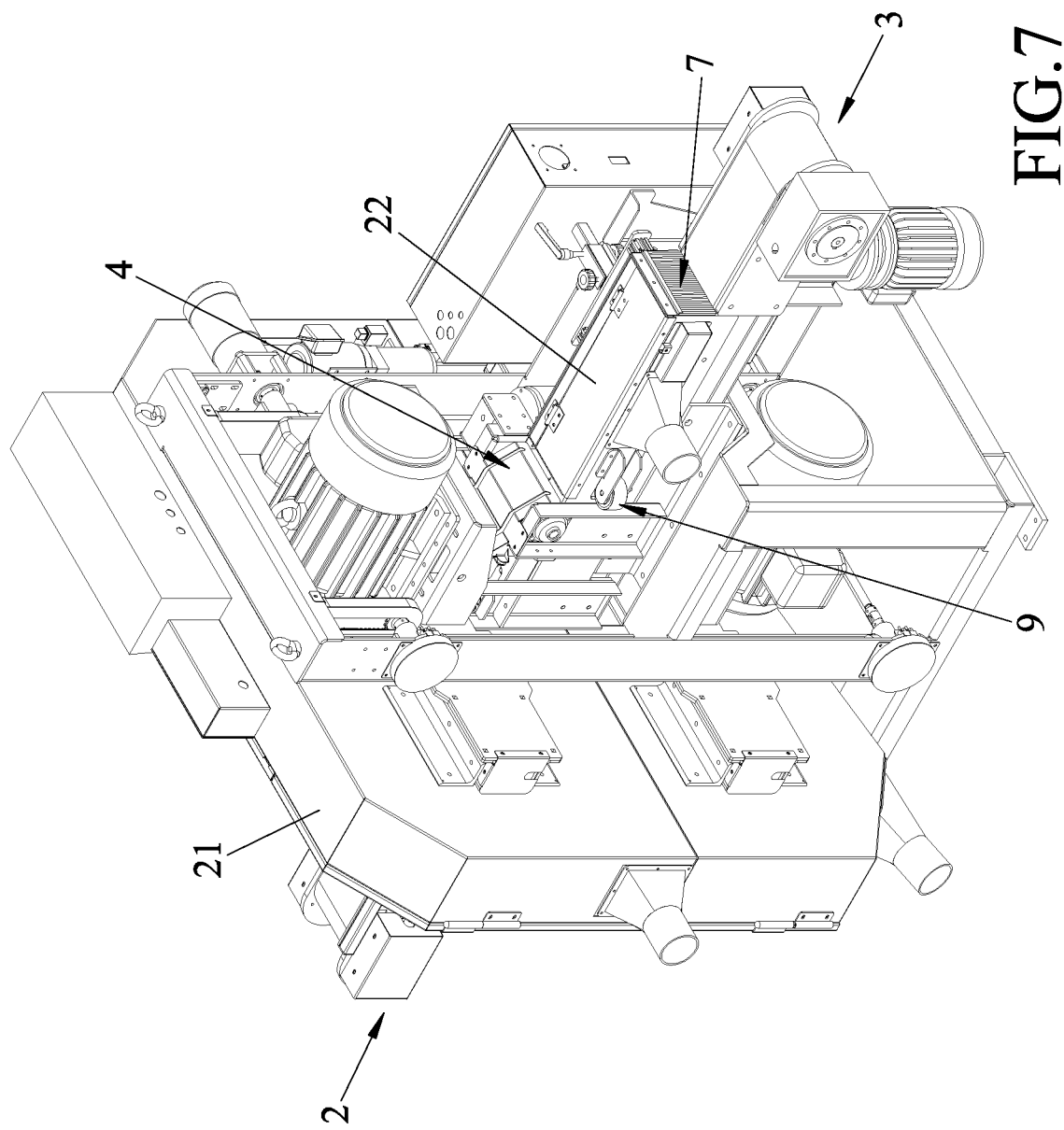
FIG. 7 is a fragmentary perspective view of the embodiment.

Referring further to FIGS. 5 to 7, the frame body unit 2 includes a support frame module 21 and a cleaning hood module 22. The support frame module 21 has an upright base plate 211 that is formed with an outlet port 214 extending therethrough in a front-rear direction (X). The support frame module 21 further has a surrounding wall 212 projecting forward from the base plate 211, and a cover plate 213 connected to a front end of the surrounding wall 212. The cover plate 213 is formed with an inlet port 215 that extends therethrough 213 and that is in alignment with the outlet port 214.

Figure 8:
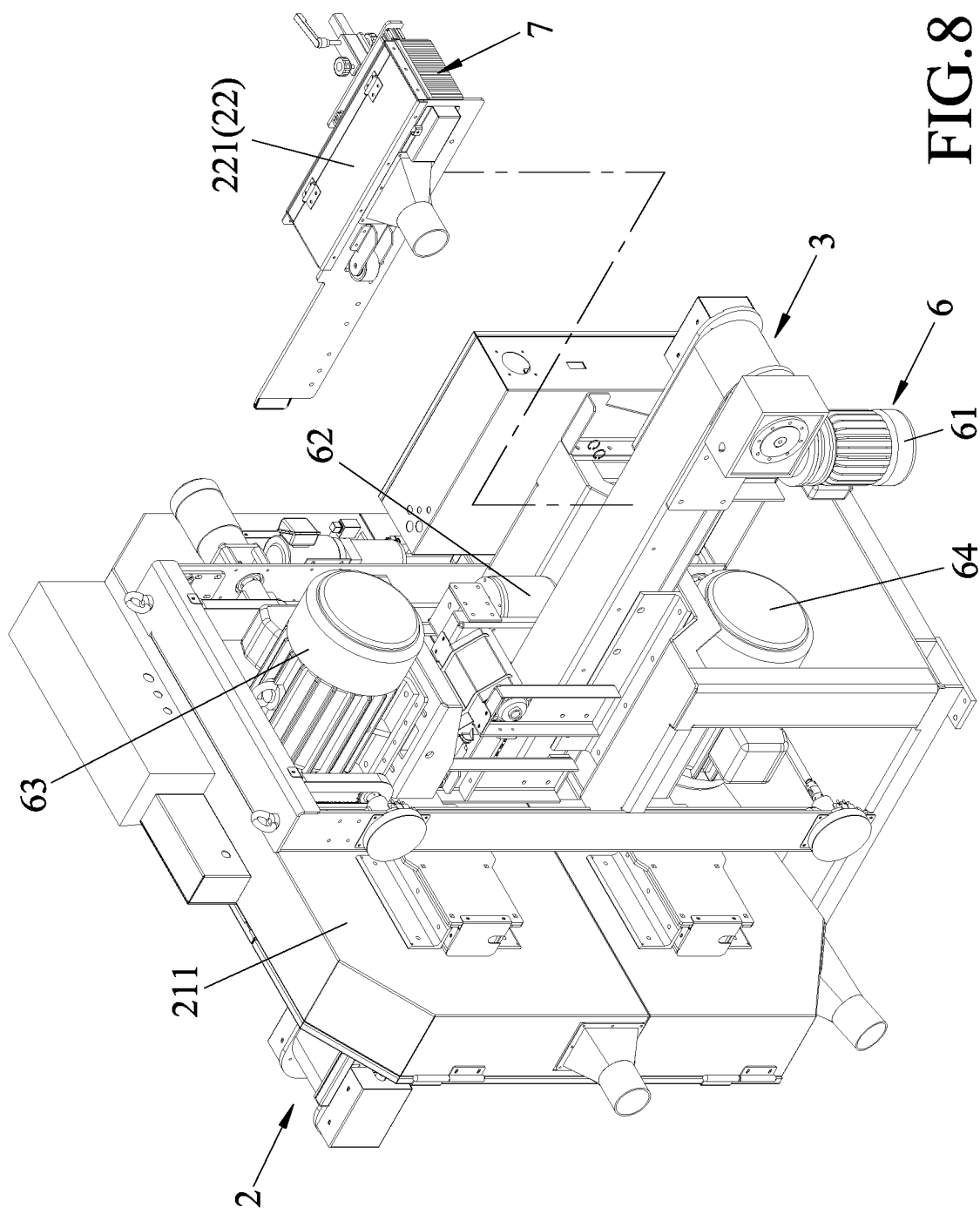
FIG. 8 is a fragmentary partly exploded perspective view of the embodiment from the perspective of FIG. 7.
Figure 9:
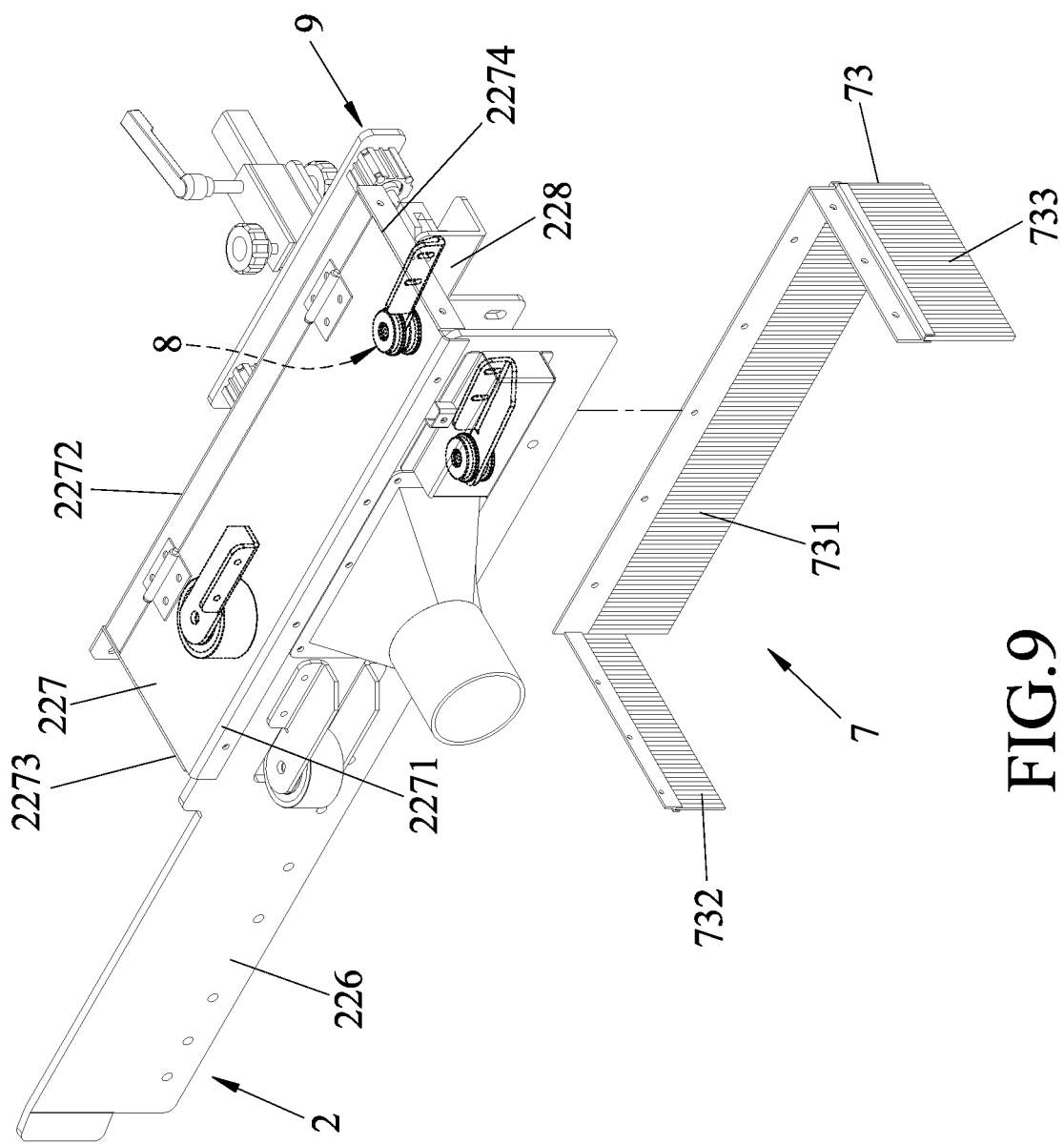
FIG. 9 is a partially exploded perspective view of a cleaning hood module, a cleaning unit, a guide unit, and a levelling unit.
Figure 10:
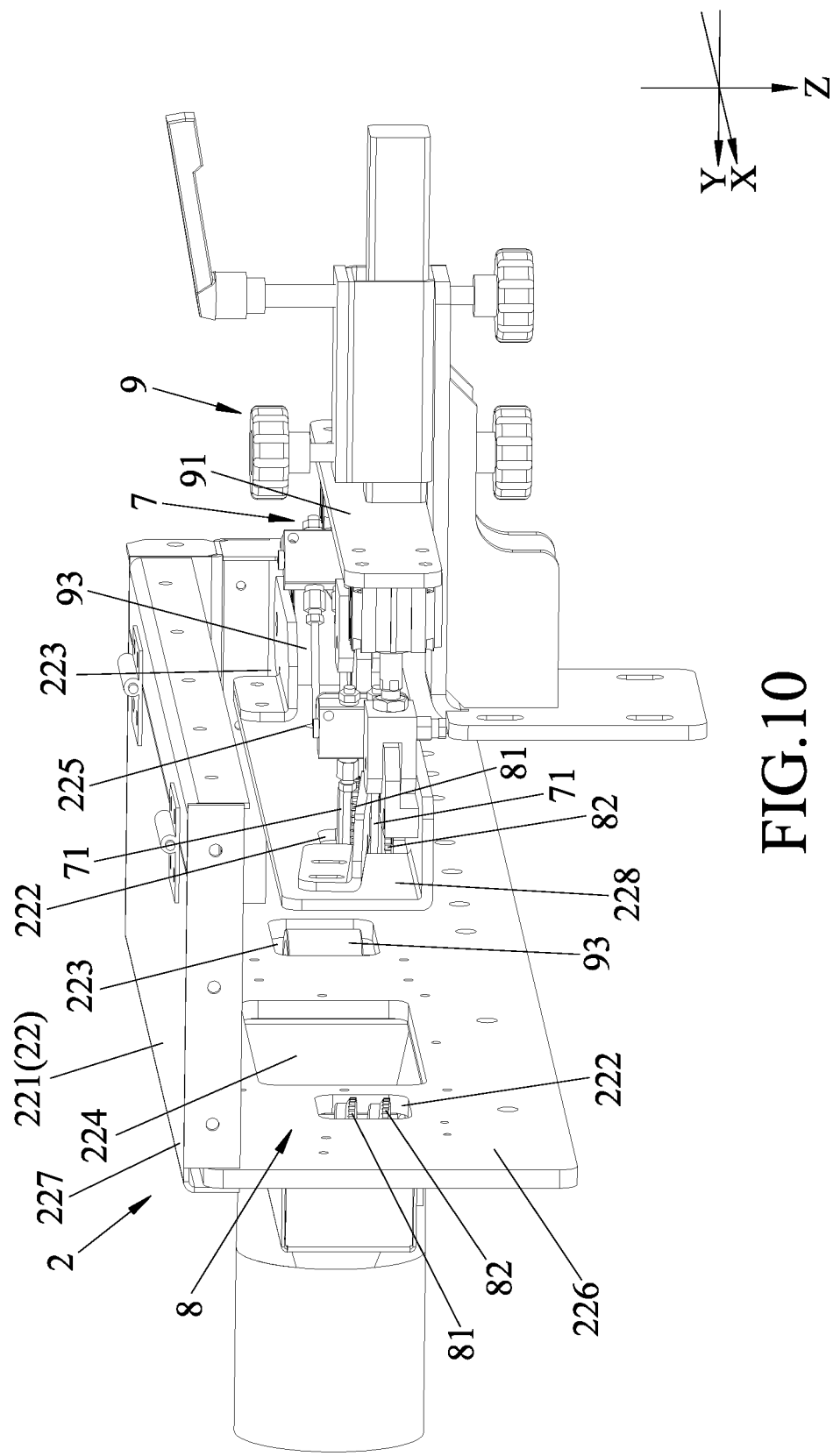
FIG. 10 is a fragmentary perspective view of the cleaning hood module, the cleaning unit, the guide unit, and the levelling unit.

Referring to FIGS. 8 to 10, the cleaning hood module 22 includes a hood body 221 extending rearward from the base plate 211 in the front-rear direction (X) and surrounding the outlet port 214 (see FIG. 5). The hood body 221 has two first openings 222 formed respectively in two opposite sides of the hood body 221 in a left-right direction (Y) which is perpendicular to the front-rear direction (X), two second openings 223 formed respectively in two opposite sides of the hood body 221 in the left-right direction (Y), a sawdust discharge port 224 formed in one of the opposite sides of the hood body 221 in the left-right direction (Y) and adapted for connection to the exhaust fan, and an air lance hole 225 (see FIG. 11).

The hood body 221 includes a side panel 226 extending rearward from the base plate 211 at one of two sides of the outlet port 214 which are opposite in the left-right direction (Y). The hood body 221 further includes a top panel 227 connected to the side panel 226 above the outlet port 214, and an alignment plate 228 disposed at the other one of the opposite sides of the outlet port 214. In this embodiment, the side panel 226 is at the left side of the outlet port 214 as seen in FIG. 10, and the alignment plate 218 is disposed at the right side of the outlet port 214 as shown in FIG. 10 and between the top panel 227 and the transport unit 3. The alignment plate 228 is movable parallel to the left-right direction (Y) relative to the side panel 226. One of the first openings 222 is formed in the alignment plate 228, and the other one of the first openings 222 is formed in the side panel 226. One of the second openings 223 is formed in the alignment plate 228, and the other one of the second openings 223 is formed in the side panel 226. The air lance hole 225 is formed in the alignment plate 228 between the one of the first openings 222 which is formed in the alignment plate 228 and the one of the second openings 223 which is formed in the alignment plate 228 (i.e., the air lance hole 225 is in front of the one of the first openings 222 that is formed in the alignment plate 228). In this embodiment, the sawdust discharge port 224 is formed in the side panel 226, and is disposed at a rear side of the air lance hole 225 and in front of the other one of the first openings 222 which is formed in the side panel 226. The top panel 227 has a first lateral edge section 2271 attached to the side panel 226, and a second lateral edge section 2272. The first lateral edge section 2271 and the second lateral edge section 2272 are opposite to each other in the left-right direction (Y). The top panel 227 further has a front edge section 2273 and a rear edge section 2274 interconnecting the first and second lateral edge sections 2271, 2272, being opposite to each other in the front-rear direction (X), and being respectively proximate to and distal from the outlet port 214.

It is noted that, in this description, upstream/upstream side or front refers to the direction where the lumber is fed from, while downstream/downstream side or rear refers to the opposite direction where the lumber is going to get cut.

Referring to FIG. 5, the transport unit 3 includes a conveyor table 31 connected to the frame body unit 2 and extending in the front-rear direction (X) through the inlet port 215 and the outlet port 214, a transport pulley set 32 containing two transport pulley members 321 that are mounted on the conveyor table 31 and that are spaced apart from each other in the front-rear direction (X), and an endless conveyor belt 33 trained on the transport pulley members 32 and driven rotatably by the two transport pulley members 321 for transporting the lumber 19 from an upstream side of the inlet port 215 to a downstream side of the outlet port 214 which is behind the outlet port 214. The cleaning hood module 22 cooperates with the conveyor belt 33 to define an output passage 331 that is communicated with the two first openings 222, the outlet port 214 and the sawdust discharge port 224 (see FIG. 10). The alignment plate 228 of the hood body 221 of the cleaning hood module 22 is disposed between the top panel 227 and the conveyor belt 33.

The hold-down unit 4 includes a track frame 41 connected to the frame body unit 2 and extending in the front-rear direction (X) through the inlet port 215 and the outlet port 214, a hold-down belt roller set 42 containing three hold-down belt roller members 421 that are mounted on the track frame 41 and that are spaced apart from each other, and an endless hold-down belt 43 trained on the hold-down belt roller members 421 and driven rotatably by the three hold-down belt roller members 421. In the present embodiment, the hold-down belt 43 is in the form of a roller chain, but is not limited thereto.

Figure 12:
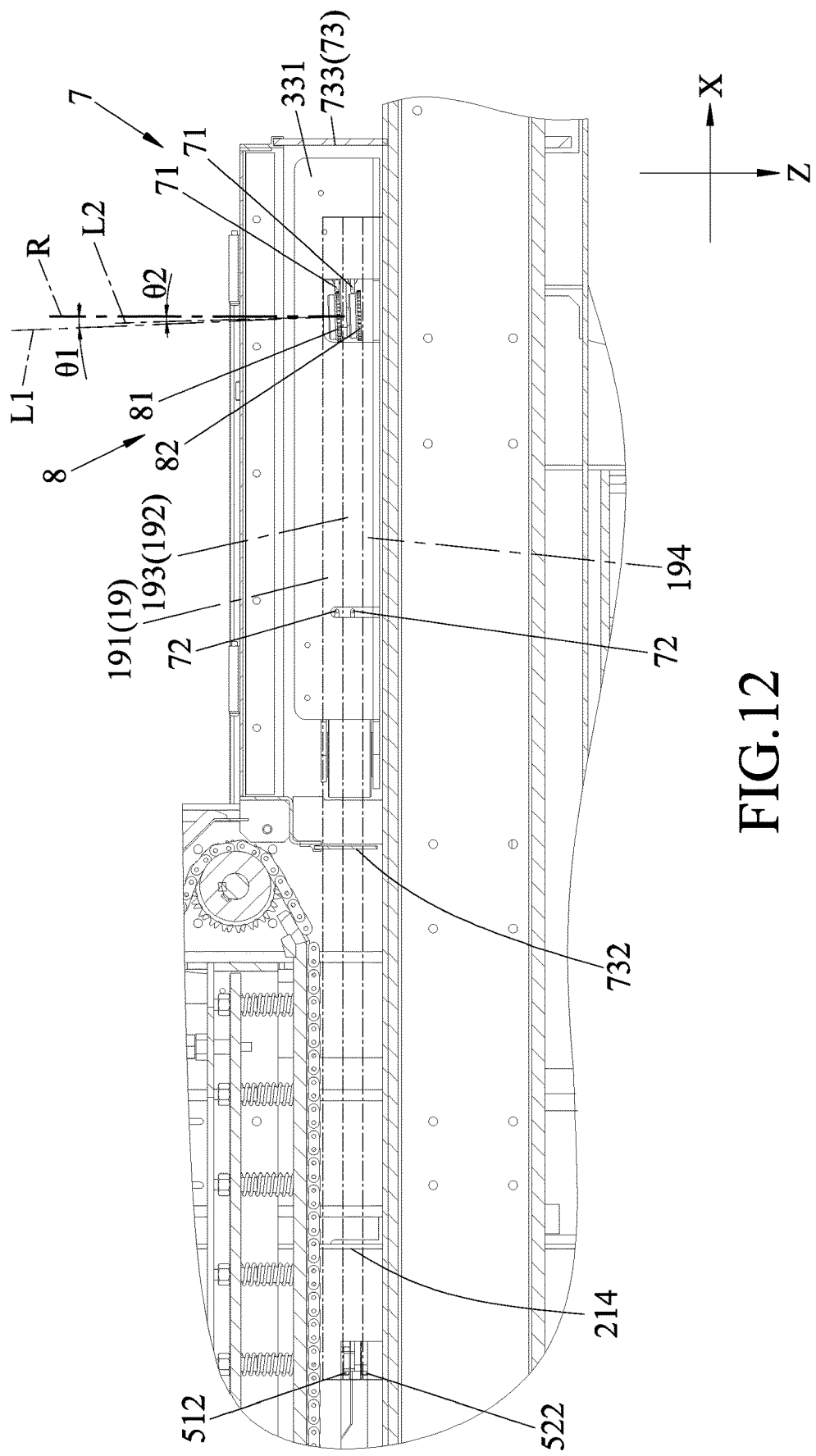
FIG. 12 is a fragmentary enlarged sectional view of FIG. 5.

Referring to FIGS. 6 and 12, the cutting unit 5 is connected to the support frame module 21 and includes a first cutter module 51 and a second cutter module 52 disposed under and spaced apart from the first cutter module 51.

The first cutter module 51 includes a first wheel set 511 including two first wheel members 513 that are connected to the base plate 211 and that are spaced apart from each other in the left-right direction (Y), and a first continuous band saw blade 512 that is trained on and driven rotatably by the first wheel members 513. The first continuous band saw blade 512 has a cutting section travelling alongside the outlet port 214 and above the conveyor belt 33, and adapted to cut the lumber 19 into an upper piece 191 and a lower piece 192.

The second cutter module 52 includes a second wheel set 521 including two second wheel members 523 that are connected to the base plate 211 and that are spaced apart from each other in the left-right direction (Y), and a second continuous band saw blade 522 that is trained on and driven rotatably by the second wheel members 523. The second continuous band saw blade 522 has a cutting section travelling alongside the outlet port 214 in an interspace between the conveyor belt 33 and the first continuous band saw blade 512 and being adapted to cut the lower piece 192 of the lumber 19 into two pieces in the thickness direction, referred to as an intermediate segment 193 that is adjacent to the upper piece 191, and a bottom segment 194 that is located under the intermediate segment 193.

Referring to FIGS. 5 and 8, the drive unit 6 is disposed on the frame body unit 2, and includes a transport unit drive motor 61 and a hold-down unit drive motor 62 that are connected respectively to the transport pulley set 32 and the hold-down belt roller set 42 and that are operable for respectively and synchronously driving rotations of the transport pulley members 321 and the hold-down belt roller members 421 to rotate the endless conveyor belt 33 and the endless hold-down belt 43. The drive unit 6 further includes a first main drive motor 63 that is connected to the first wheel set 511 and that is operable for driving rotation of the first wheel members 513 to rotate the first continuous band saw blade 512, and a second main drive motor 64 that is connected to the second wheel set 521 and that is operable for driving rotation of the second wheel members 523 to rotate the second continuous band saw blade 522.

Figure 11:
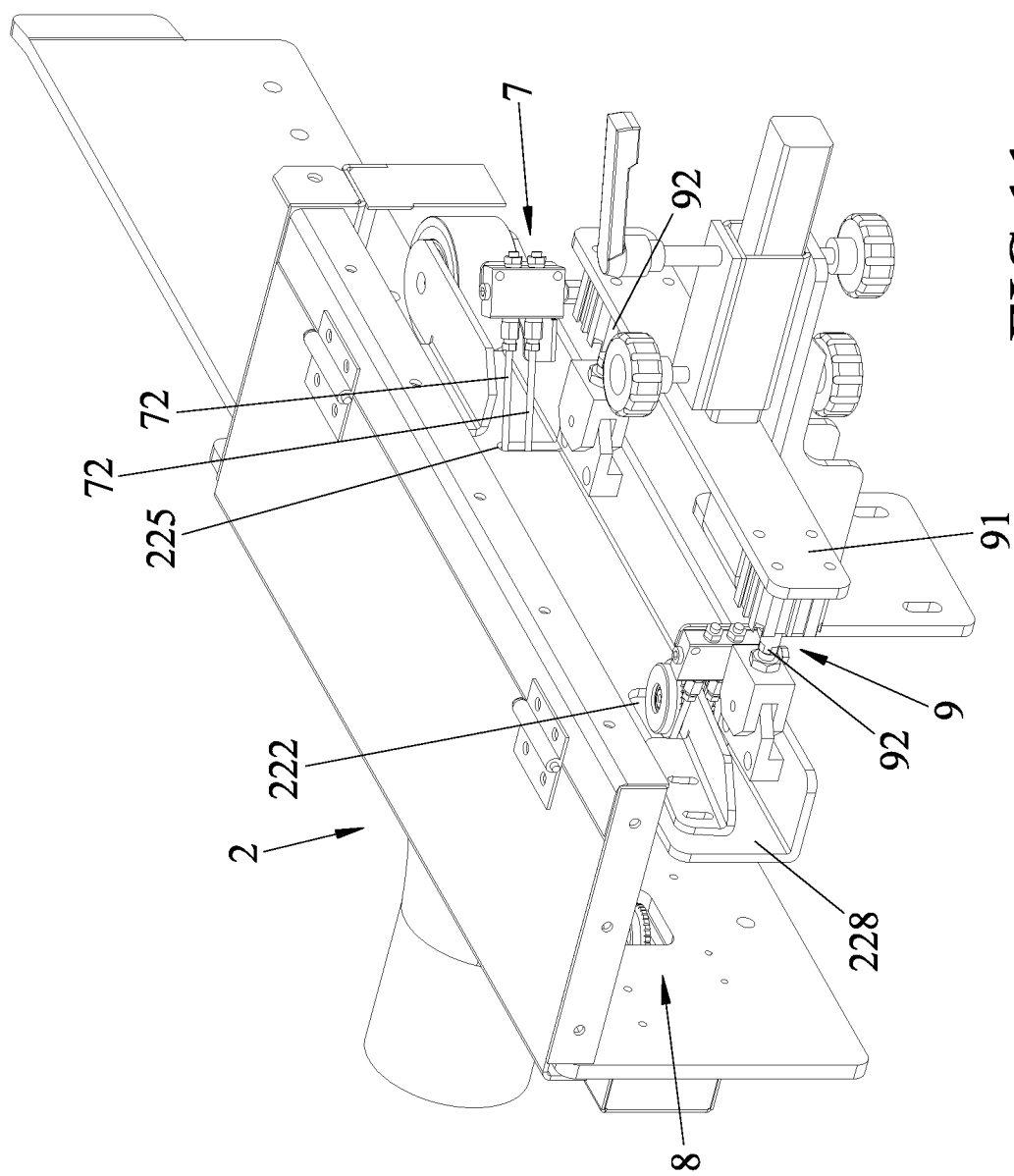
FIG. 11 is a fragmentary perspective view of the cleaning hood module, the cleaning unit, the guide unit, and the levelling unit from another perspective.

Referring to FIGS. 9 to 11, the cleaning unit 7 includes two first air lances 71 spaced apart in an up-down direction (Z) which is perpendicular to the front-rear direction (X) and the left-right direction (Y), and extending into the outlet passage 331 through the one of the first openings 222 that is formed in the alignment plate 228 for directing an air stream to the conveyor belt 33. The cleaning unit 7 further includes two second air lances 72 spaced apart in the up-down direction (Z) and extending into the outlet passage 331 through the air lance hole 225 for directing an air stream to the conveyor belt 33 (see FIG. 12), and a sawdust sweeping brush 73 extending downward from the top panel 227.

The sawdust sweeping brush 73 has a first bristle portion 731 attached to the second lateral edge section 2272 of the top panel 227, a second bristle portion 732 attached to the front edge section 2273 of the top panel 227, and a third bristle portion 733 attached to the rear edge section 2274 of the top panel 227.

Referring to FIGS. 5, 10, and 12, the guide unit 8 includes two upper guide rollers 81 that are mounted rotatably to the hood body 221, that extend respectively through the two first openings 222 into the outlet passage 331, and that are disposed in front of the first air lances 71. The guide unit 8 further includes two lower guide rollers 82 that are mounted rotatably to the hood body 221, that are respectively under the upper guide rollers 81, and that extend respectively through the two first openings 222 into the outlet passage 331.

The two upper guide rollers 81 are positioned higher than the cutting section of the first continuous band saw blade 512 and adapted to be respectively in contact with two opposite sides of the lumber 19 in the left-right direction (Y), so as to separate the upper piece 191 of the lumber 19 from the lower piece 192 of the lumber 19. Each upper guide roller 81 rotates about a first axis (L1) that is inclined forward and that has a first included angle (θ1) with reference to a vertical axis (R) extending in the up-down direction (Z) as shown in FIG. 12. The first included angle (θ1) is less than 30 degrees.

The two lower guide rollers 82 are positioned lower than the cutting section of the first continuous band saw blade 512 and higher than the cutting section of the second continuous band saw blade 522, and adapted to be respectively in contact with two opposite sides of the lumber 19 in the left-right direction (Y) to separate the intermediate segment 193 of the lower piece 192 of the lumber 19 from the bottom segment 194 of the lower piece 192. Each lower guide roller 82 rotates about a second axis (L2) that is inclined forward and that has a second included angle (θ2) with reference to the vertical axis (R). The second included angle (θ2) is less than the first included angle (θ1).

Referring to FIGS. 10 to 12, the levelling unit 9 includes an adjustable retaining member 91 mounted to the frame body unit 2, that is disposed at a side of the alignment plate 228 which is opposite to the side panel 226, and that is movable parallel to the left-right direction (Y) relative to the side panel 226. The levelling unit 9 further includes two stretchable biasing members 92 that extend through the first bristle portion 731 of the sawdust sweeping brush 73 of the cleaning unit 7 (see FIG. 9), and that interconnect the adjustable retaining member 91 and the alignment plate 228. The levelling unit 9 further includes two positioning rollers 93 mounted rotatably and respectively to the side panel 226 and the alignment plate 228. Movement of the adjustable retaining member 91 parallel to the left-right direction (Y) drives the alignment plate 228 to move parallel to the left-right direction (Y), and the biasing member 92 is disposed for biasing the alignment plate 228 to abut the positioning roller 93 which is mounted to the alignment plate 228 against a lateral side of the lumber 19. In the present embodiment, the biasing member 92 is an air buffer, but is not limited thereto.

Each positioning roller 93 extends into the outlet passage 331 through a respective one of the second openings 223, and has opposite top and bottom ends in the up-down direction (Z). The top end of each positioning roller 93 is higher in the up-down direction (Z) than the cutting section of the first continuous band saw blade 512, and the bottom end of each positioning roller 93 is lower in the up-down direction (Z) than the cutting section of the second continuous band saw blade 522.

The adjustable retaining member 91 can be actuated by an electric motor, a hydraulic cylinder and the like, and in turn drives the alignment plate 228 to move in the left-right direction (Y) relative to the side panel 226.

Referring to FIGS. 4 and 5, a vise module 94 is disposed upstream of the first continuous band saw blade 512 and the second continuous band saw blade 522. The vise module 94 includes an upstanding fixed jaw plate 941 disposed on the conveying table 31 to the right of the conveyor belt 33 from the perspective of FIG. 4 and protruding above the conveyor belt 33 in front of the first continuous band saw blade 512 and the second continuous band saw blade 522, a positioning plate 942 disposed to the left of the conveyor belt 33 from the perspective of FIG. 4 and movable parallel to the left-right direction (Y), a movable jaw plate 943 disposed between the fixed jaw plate 941 and the positioning plate 942, and two cushioning members 944 connected between the movable jaw plate 943 and the positioning plate 942. When the positioning plate 942 is moved parallel to the left-right direction (Y), the movable jaw plate 943 is driven to move parallel to the left-right direction (Y) relative to the fixed jaw plate 941. In the present embodiment, the cushioning members 944 are springs, but are not limited thereto.

The positioning plate 942 can be actuated by an electric motor, a hydraulic cylinder and the like and in turn drives the movable jaw plate 943 to move relative to the fixed jaw plate 941 in the left-right direction (Y) relative to the fixed jaw plate 941.

Referring to FIGS. 4, 5, and 10, before starting the cutting operation of the lumber 19, the exhaust fan is connected to the sawdust discharge port 224, and the positioning plate 942 of the vise module 94 is manipulated to adjust the spacing between the movable jaw plate 943 and the fixed jaw plate 941 parallel to the left-right direction (Y) until the spacing is fit with the width of the lumber 19. Afterward, the positioning plate 942 is positioned relative to the fixed jaw plate 941 in the left-right direction (Y). In addition, the adjustable retaining member 91 of the levelling unit 9 is moved relative to the side panel 226 parallel to the left-right direction (Y) so as to adjust the spacing between the alignment plate 228 and the side panel 226 in accordance with the width of the lumber 19, and is then positioned in the left-right direction (Y).

At the start of cutting operation, the lumber 19 is laid on the conveyor belt 33 of the transport unit 3 upstream of the inlet port 215, the movable jaw plate 943 will push against one lateral side of the lumber 19 relative to the fixed jaw plate 941 to restrict the cutting width of the lumber 19 in the left-right direction (Y).

The lumber 19 is moved downstream by the conveyor belt 33. when the lumber 19 is moved to a position under the hold-down belt 43, the hold-down belt 43 clamps the lumber 100 to restrict the lumber 100 in the up-down direction (Z), and the conveyor belt 33 and the hold-down belt 43 are synchronously driven to move the lumber 19.

Referring to FIGS. 5, 10, and 12, the lumber 19 is then carried downstream through the inlet port 215 to get cut by the first and second continuous band saw blades 512, 522, into three thinner pieces when moving past the cutting sections of the first and second continuous band saw blades 512, 522, namely the upper piece 191, the intermediate segment 193, and the bottom segment 194, hereinafter together referred to as resawn pieces. Subsequently, the resawn pieces continues to be carried downstream to the outlet port 214, and enters the outlet passage 331 past the second bristle portion 732 of the sawdust sweeping brush 73. Sawdust (not shown) attached to the resawn pieces of lumber 19 during cutting operation will be swept by the second bristle portion 732.

As the resawn pieces of lumber 19 enters the output passage 331 and in friction contact with the upper guide rollers 81 and the lower guide rollers 82 at two lateral sides, the upper guide rollers 81 separate the upper piece 191 from the lower piece 192 in the up-down direction (Z), and the lower guide rollers 82 separate the intermediate segment 193 from the bottom segment 194 in the up-down direction (Z). With the arrangement of the first air lances 71 and the second air lances 72 of the cleaning unit 7, sawdust attached to the outer surrounding surface and the surfaces between the resawn pieces of lumber 19 can be purged by the air stream directed through the first air lances 71 and the second air lances 72.

Subsequently, when the resawn pieces of lumber 19 are continued to be moved downstream past the third bristle portion 733 of the sawdust sweeping brush 73 to exit the outlet passage 331, the third bristle portion 733 further cleans sawdust attached to the outer surrounding surface and the surfaces between the resawn pieces of lumber 19. In this way, with the arrangement of the second bristle portion 732, the second air lances 72, the first air lances 71, and the third bristle portion 733, the sawdust attached to the outer surface of the resawn pieces of lumber 19 and the surfaces between the upper piece 191, the intermediate segment 193 and the bottom segment 194 can be better cleaned to provide more clean resawn pieces of lumber 19, and effectively shorten the time for cleaning.

In the foregoing cleaning operations, the sawdust remains in the outlet passage 331 will be entrained by the air stream created by the exhaust fan and discharged from the sawdust discharge port 224, thus preventing the sawdust to accumulate on the conveyor belt 33.

It is worth mentioning that the second bristle portion 732 and the third bristle portion 733 not only sweep away the sawdust attached to the outer surrounding surface of the resawn pieces of lumber 19, but also cooperate with the first bristle portion 731 and the side panel 226 (see FIG. 9) to prevent the sawdust in the outlet passage 331 from being scattering outside the hood body 221 under the action of the air streams directed through the second air lances 72 and the first air lances 71.

It should be particularly noted that, as the resawn pieces of lumber 19 enter the discharge passage 331 through the outlet port 214 and are clamped between the positioning rollers 93, since the top end of each positioning roller 93 is higher than the cutting section of the first continuous band saw blade 512, and since the bottom end of each positioning roller 93 is lower than the cutting section of the second continuous band saw blade 522, the upper piece 191, the intermediate segment 193 and the bottom segment 194 will be clamped concurrently and positioned relative to each other in the left-right direction (Y).

It should be noted that, in this embodiment, the hold-down unit 4 can be driven by the hold-down unit drive motor 62 in synchronization with the transport unit 3 to move the lumber 19, however, in other implementations the hold-down unit drive motor 62 may be left out and the hold-down unit 4 may also be other forms as long as the purpose of clamping the lumber 19 in the up-down direction (Z) can be attained.

Further, in the present embodiment, the cleaning unit 7 includes two first air lances 71 and two second air lances 72, but is not limited thereto. For example, the cleaning unit 7 may include only one first air lance 71 and only one second air lance 72, as long as efficient air streams can be directed to the conveyor belt 33.

It should be noted that, in this embodiment, the levelling unit 9 includes two biasing members 92, however, in other implementations, only one biasing member 92 may also be used to urge the alignment plate 228 in the left-right direction (Y).

In summary, the upper guide rollers 81 of the guide unit 8 are configured to separate the upper piece 191 from the lower piece 192, and the lower guide rollers 82 of the guide unit 8 are configured to separate the intermediate segment 193 from the bottom segment 194 in the up-down direction (Z), and the second air lances 72 and the first air lances 71 of the cleaning unit 7 are configured to direct air streams to the conveyor belt 33, thus the sawdust attached to the outer surrounding surface of the lumber 19 and the surfaces between the upper piece 191, the intermediate segment 193 and the bottom segment 194 can be blown away. Further, the sawdust remains in the outlet passage 331 will be entrained by the airflow created by the exhaust fan and discharged from the sawdust discharge port 224, thus preventing the sawdust to accumulate on the conveyor belt 33. Therefore, the object of the present disclosure can be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A band saw machine for cutting a lumber, said band saw machine comprising:
a frame body unit including a support frame module and a cleaning hood module, said support frame module having an upright base plate that is formed with an outlet port extending therethrough in a front-rear direction, said cleaning hood module including a hood body that extends rearward from said base plate in said front-rear direction, that surrounds said outlet port, and that has two first openings formed respectively in opposite sides of said hood body in a left-right direction which is perpendicular to the front-rear direction;
a transport unit connected to said frame body unit, and including a conveyor belt that extends in said front-rear direction through said outlet port and adapted to transport said lumber from an upstream side of said outlet port which is in front of said outlet port to a downstream side of said outlet port which is behind said outlet port, said cleaning hood module cooperating with said conveyor belt to define an output passage that is communicated with said two first openings and said outlet port and that has a rear open end;
a cutting unit connected to said support frame module, and including a first cutter module, said first cutter module including a first continuous band saw blade that has a cutting section travelling alongside said outlet port and above said conveyor belt, and that is adapted to cut said lumber into an upper piece and a lower piece;
a cleaning unit including a first air lance that extends through one of said first openings of said hood body of said cleaning hood module for directing an air stream to said conveyor belt; and
a guide unit including two upper guide rollers that are mounted rotatably on said hood body, that extend respectively through said two first openings into said outlet passage, and that are disposed in front of said first air lance, said two upper guide rollers being disposed higher than said cutting section of said first continuous band saw blade and adapted to be respectively in contact with two opposite sides of said lumber in said left-right direction to separate said upper piece of said lumber from said lower piece of said lumber.

2. The band saw machine as claimed in claim 1, wherein each of said two upper guide rollers rotates about a first axis that is inclined forward and that has a first included angle with reference to a vertical axis extending in an up-down direction which is perpendicular to said front-rear direction and said left-right direction.

3. The band saw machine as claimed in claim 2, wherein said first included angle is less than 30 degrees.

4. The band saw machine as claimed in claim 2, wherein said first cutter module of said cutting unit further includes a first wheel set connected to said base plate, said first continuous band saw blade being trained on said first wheel set.

5. The band saw machine as claimed in claim 4, wherein said cutting unit further includes a second cutter module disposed under and spaced apart from said first cutter module set, said second cutter module including a second wheel set that is connected to said base plate, and a second continuous band saw blade that is trained on said second wheel set, said second continuous band saw blade having a cutting section that travels alongside said outlet port and between said conveyor belt and said first continuous band saw blade, and that is adapted to cut said lower piece of said lumber into an intermediate segment being adjacent to said upper piece of said lumber, and a bottom segment being under said intermediate segment.

6. The band saw machine as claimed in claim 5, wherein said guide unit further includes two lower guide rollers that are mounted rotatably on said hood body, that are respectively under said two upper guide rollers, and that extend respectively through said two first openings into said outlet passage, said two lower guide rollers being disposed lower than said cutting section of said first continuous band saw blade and higher than said cutting section of said second continuous band saw blade, and adapted to be respectively in contact with two opposite sides of said intermediate segment of said lumber in said left-right direction to separate said top piece from said bottom segment of said lumber.

7. The band saw machine as claimed in claim 6, wherein each of said two lower guide rollers rotates about a second axis that is inclined forward and that has a second included angle with reference to the vertical axis, said second included angle being less than said first included angle.

8. The band saw machine as claimed in claim 1, wherein said hood body of said cleaning hood module of said frame body unit further has a sawdust discharge port formed in one of two sides of said hood body which are opposite in the left-right direction, and communicated with said outlet passage.

9. The band saw machine as claimed in claim 8, wherein said hood body of said cleaning hood module includes a side panel extending rearward from said base plate at one of two sides of said outlet port which are opposite in the left-right direction, a top panel connected to said side panel above said outlet port, and an alignment plate disposed at the other one of said two sides of said outlet port and between said top panel and said conveyor belt and being movable parallel to the left-right direction relative to said side panel, said sawdust discharge port being formed in said side panel, one of said first openings being formed in said alignment plate, the other one of said first openings being formed in said side panel.

10. The band saw machine as claimed in claim 9, further comprising a levelling unit including an adjustable retaining member that is mounted to said frame body unit, that is disposed at a side of said alignment plate which is opposite to said side panel, and that is movable parallel to said left-right direction relative to said side panel, and a biasing member that interconnect said adjustable retaining member and said alignment plate such that movement of said adjustable retaining member parallel to said left-right direction drives said alignment plate to move parallel to said left-right direction, said biasing member being disposed for biasing said alignment plate to abut against a lateral side of said lumber.

11. The band saw machine as claimed in claim 10, wherein said cleaning hood module of said frame body unit further has two second openings formed respectively in said side panel and said alignment plate, said levelling unit further including two positioning rollers that are mounted rotatably and respectively to said side panel and said alignment plate, and extending respectively through said second openings into said outlet passage, each positioning roller having opposite top and bottom ends in an up-down direction which is perpendicular to said front-rear direction and said left-right direction, said top end of each positioning roller being higher in the up-down direction than said cutting section of said first continuous band saw blade, said bottom end of each positioning roller being lower in the up-down direction than said cutting section of said second continuous band saw blade.

12. The band saw machine as claimed in claim 10, wherein said cleaning hood module of said frame body unit further has an air lance hole formed in said alignment plate and being in front of said one of said first openings that is formed in said alignment plate, said sawdust discharge port being disposed at a rear side of said air lance hole and disposed in front of said other one of said first openings that is formed in said side panel, said first air lance protruding into said outlet passage through said one of said first openings that is formed in said alignment plate, said cleaning unit further including a second air lance that protrudes into said outlet passage through said air lance hole for directing an air stream to said conveyor belt.

13. The band saw machine as claimed in claim 10, wherein said top panel of said frame body unit has a first lateral edge section attached to said side panel, and a second lateral edge section, said first lateral edge section and said second lateral edge section being opposite to each other in the left-right direction, said top panel further having a front edge section and a rear edge section that interconnect said first and second lateral edge sections, that are opposite to each other in the front-rear direction, and that are respectively proximate to and distal from said outlet port, said cleaning unit further including a sawdust sweeping brush that extends downward from said top panel, said sawdust sweeping brush having a first bristle portion that is attached to said second lateral edge section of said top panel, a second bristle portion that is attached to said front edge section of said top panel, and a third bristle portion that is attached to said rear edge section of said top panel, said biasing member of said levelling unit extending through said first bristle portion.

* * * * *